US008391493B2

(12) United States Patent
Li et al.

(10) Patent No.: US 8,391,493 B2
(45) Date of Patent: Mar. 5, 2013

(54) PROBABILISTIC MITIGATION OF CONTROL CHANNEL JAMMING VIA RANDOM KEY DISTRIBUTION IN WIRELESS COMMUNICATIONS NETWORKS

(75) Inventors: Mingyan Li, Redmond, WA (US); Patrick Tague, Seattle, WA (US); Radha Poovendran, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1292 days.

(21) Appl. No.: 12/040,317

(22) Filed: Feb. 29, 2008

(65) Prior Publication Data

US 2009/0220092 A1    Sep. 3, 2009

(51) Int. Cl.
    *H04L 29/06*    (2006.01)
(52) U.S. Cl. ............................. 380/278; 380/44; 713/168
(58) Field of Classification Search .................... 380/278
    See application file for complete search history.

(56) References Cited

U.S. PATENT DOCUMENTS

| | | | |
|---|---|---|---|
| 2002/0147906 A1* | 10/2002 | Lotspiech et al. | 713/158 |
| 2003/0065747 A1* | 4/2003 | Sakamoto et al. | 709/219 |
| 2004/0091116 A1* | 5/2004 | Staddon et al. | 380/277 |
| 2005/0108309 A1* | 5/2005 | Tsuboka et al. | 708/250 |
| 2005/0141706 A1* | 6/2005 | Regli et al. | 380/44 |
| 2008/0187136 A1* | 8/2008 | Zhang et al. | 380/270 |

OTHER PUBLICATIONS

Chan, Agnes; Liu, Xin; Noubir, Guevara; Thapa, Bishal; "Control Channel Jamming: Resilience and Identification of Traitors", In Proc. IEEE International Symposium on Information Theory, Nice, France, Jun. 2007.*
Chan, et al., Abstract Paper entitled "Control Channel Jamming: Resilience and Identification of Traitors," College of Computer and Information Science, Northeastern University, Boston, MA; 5 pages.
Chan, et al. Abstract Paper entitled "Random Key Predistribution Schemes for Sensor Networks," Carnegie Mellon University; 17 pages.

* cited by examiner

*Primary Examiner* — Kim Vu
*Assistant Examiner* — Yogesh Paliwal
(74) *Attorney, Agent, or Firm* — Hope Baldauff Hartman, LLC

(57) ABSTRACT

An embodiment includes methods that generate random cryptographic keys, and send the keys to client devices. These methods may send representations of channel locator functions to the client devices, which may use the channel locator functions to locate particular control channels, using the random keys as input.

18 Claims, 7 Drawing Sheets

GRAPH 2 ature, further details of which can be seen with reference to the following description and drawings.
PROBABILISTIC MITIGATION OF CONTROL CHANNEL JAMMING VIA RANDOM KEY DISTRIBUTION IN WIRELESS COMMUNICATIONS NETWORKS

BACKGROUND

Typical wireless communication networks provide and maintain a plurality of data communication channels, and one or more control channels. The control channels may present attractive targets to adversaries seeking to undermine the communication networks. If such adversaries may jam or otherwise interfere with the operations of the control channels, the adversaries may deny network services to legitimate users.

SUMMARY

It should be appreciated that this Summary is provided to introduce a selection of concepts in a simplified form that are further described below in the Detailed Description. This Summary is not intended to limit the scope of the claimed subject matter.

This description discusses probabilistic mitigation of control channel jamming via random key distribution in wireless communications networks. The description provides computer-based methods that generate random cryptographic keys, and send the keys to client devices. These methods may send channel locator functions to the client devices, which may use the channel locator functions to locate particular control channels, using the random keys as input. The tools may provide additional computer-based methods that receive the keys and the channel locator functions from base stations within the networks. The tools may also provide key distribution systems for operation within the networks, with these systems generating representations of the keys, and associating the keys respectively with control channel locations. These systems may allocate and send the keys to subscriber devices within the network, may define timeslots within the networks, and may allocate the keys to respective timeslots.

The features, functions, and advantages discussed herein may be achieved independently in various embodiments of the present description or may be combined in yet other embodiments, further details of which can be seen with reference to the following description and drawings.

DETAILED DESCRIPTION

Figure 1:
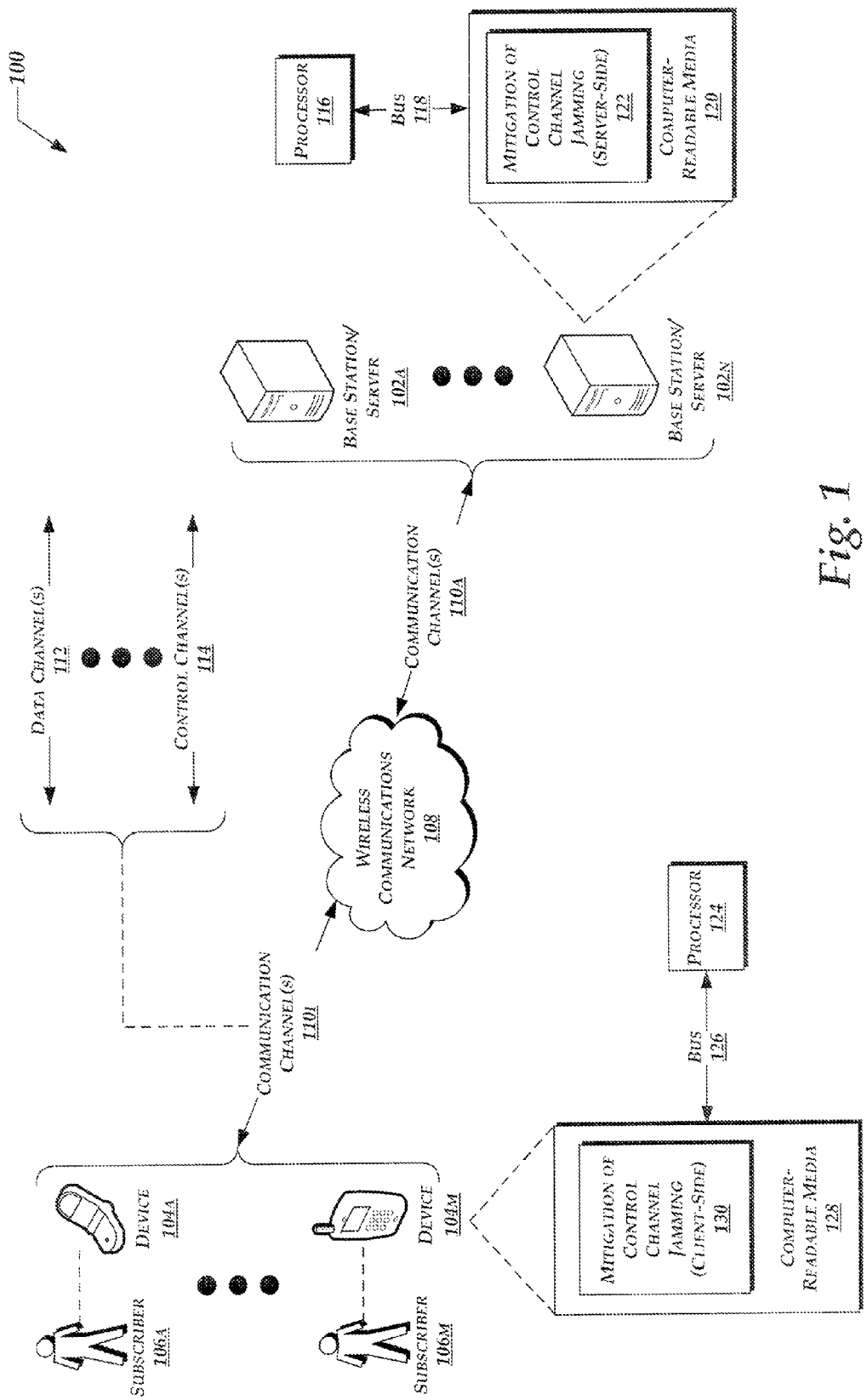
FIG. 1 is a block diagram illustrating exemplary systems or operating environments for probabilistic mitigation of control channel jamming via random key distribution. As used herein, the term exemplary indicates an example and not necessarily an ideal.

The following detailed description discloses various tools and techniques for probabilistic mitigation of control channel jamming via random key distribution. This description proceeds with reference to various drawings, and to numerals appearing within the drawings. The first digit within a given reference numeral indicates the drawing in which that numeral first appears.

FIG. 1 illustrates exemplary systems or operating environments, denoted generally at 100, for probabilistic mitigation of control channel jamming via random key distribution. These systems 100 may include one or more base stations or servers. FIG. 1 illustrates two instances of servers, denoted at 102a and 102n (collectively, servers 102). However, this arrangement is illustrative only, and implementations of the systems 100 may include any number of servers as appropriate.

These servers 102 may communicate with any number of client devices 104, with FIG. 1 illustrating two examples of such client devices at 104a and 104m. Once again, the number of client devices shown in FIG. 1 is an example only, and implementations may incorporate any number of client devices. As shown, prospective subscribers may be associated with the client devices, with FIG. 1 showing examples of subscriber 106a using the client device 104a, and a subscriber 106m using a client device 104m.

In the example shown in FIG. 1, the devices 104 may represent handheld mobile wireless communication devices, such as cellular phones, smart phones, wireless-enabled personal digital assistants (PDAs), or the like. For example, the client device 104a may be a mobile phone having a hinged or foldable configuration, and the device 104m may be a smart phone or wireless-enabled PDA. However, other examples of the client devices 104 are possible, with FIG. 1 providing non-limiting examples. Generally, the graphical elements used in FIG. 1 to depict various components are chosen only to facilitate illustration, and not to limit possible implementations of the description herein.

These servers 102 and the client devices 104 may communicate via one or more instances of wireless communication networks, denoted generally at 108. More specifically, standards and/or protocols governing communications between the servers 102 and 104 may define one or more communication channels 110 by which the base stations and client devices may communicate via the network. One non-limiting example of such standards or protocols is the global system for mobile communications (GSM). For ease of description and illustration, FIG. 1 illustrates communication channels 110a between the network 108 and these servers 102, and illustrates communication channels 110i between the client devices 104 and the network 108.

Turning to the communication channels 110 in more detail, these channels may include at least one or more instances of data channels 112 and at least one or more instances of control channels 114. The particular number of data channels and control channels may vary in different implementations, according to which standard or protocol is in place. Assuming an illustrative GSM implementation, the control channels 114 may include a dedicated uplink control channel (e.g., random-access channel (RACH)).

In general, the data channels 112 may transmit voice or data (which may be digitized into packets or other suitable structures for transmission) between client devices and these servers. The control channels 114 may support a wide variety of services, including for example propagating network topology for routing, control access to services for which the subscribers have enrolled, or the like. For example, the servers may coordinate with system subscribers over a variety of control channels to perform access control, traffic channel allocation, handing calls from station-to-station, and any number of other functions. In many wireless networks, the control channels, and data transmitted thereon, may serve as a platform on which higher-level protocols are built.

In some instances, an adversary may disable the functionality of the overall systems 100 by attacking and disabling the control channels 114, and thereby may deny services to the subscribers 106. However, the description herein provides various tools and techniques for mitigating the consequences of such attacks, and providing improved resiliency to the systems 100 as a whole, as now described in more detail.

Turning to the base stations/servers 102 in more detail, these may include one or more processors 116, which may have a particular type or architecture, chosen as appropriate for particular implementations. The processors 116 may couple to one or more bus systems 118 that are chosen for compatibility with the processors 116.

The servers 102 may include one or more instances of computer-readable storage media 120, which couple to the bus systems 118. The bus systems may enable the processors 116 to read code and/or data to/from the computer-readable storage media 120. The media 120 may represent storage elements implemented using any suitable technology, including but not limited to semiconductors, magnetic materials, optics, or the like. The media 120 may include memory components, whether classified as random-access memory (RAM), read-only memory (ROM), flash, or other types, and may also represent hard disk drives.

The storage media 120 may include one or more modules 122 of instructions that, when loaded into the processor 116 and executed, cause the server 102 to execute the various tools and techniques described herein for probabilistic mitigation of control channel jamming via random key distribution. These modules may implement the various algorithms and data flows described and illustrated herein, to the extent that the servers 102 may perform various aspects of those algorithms and data flows.

Turning now to the client devices 104 in more detail, these may include one or more processors 124, which may have a particular type or architecture, chosen as appropriate for particular implementations. The processors 124 may or may not be same type and/or architecture as the processor 116 shown in the base stations. The processors 124 may couple to one or more bus systems 126 that are chosen for compatibility with the processors 124.

The devices 104 may include one or more instances of computer-readable storage media 128, which couple to the bus systems 126. The bus systems may enable the processors 124 to read code and/or data to/from the computer-readable storage media 128. The media 128 may represent storage elements implemented using any suitable technology, including but not limited to semiconductors, magnetic materials, optics, or the like. The media 128 may include memory components, whether classified as RAM, ROM, flash, or other types, and may also represent hard disk drives.

The storage media 128 may include one or more modules 130 of instructions that, when loaded into the processor 116 and executed, cause the device 104 to execute the various tools and techniques described herein for probabilistic mitigation of control channel jamming via random key distribution. These modules may implement the various algorithms and data flows described and illustrated herein, to the extent that the devices 104 may perform various aspects of those algorithms and data flows.

Having described the overall systems 100, the discussion now proceeds to a description of illustrative process and data flows for probabilistic mitigation of control channel jamming via a random key distribution. This discussion is now presented with FIG. 2.

Figure 2:
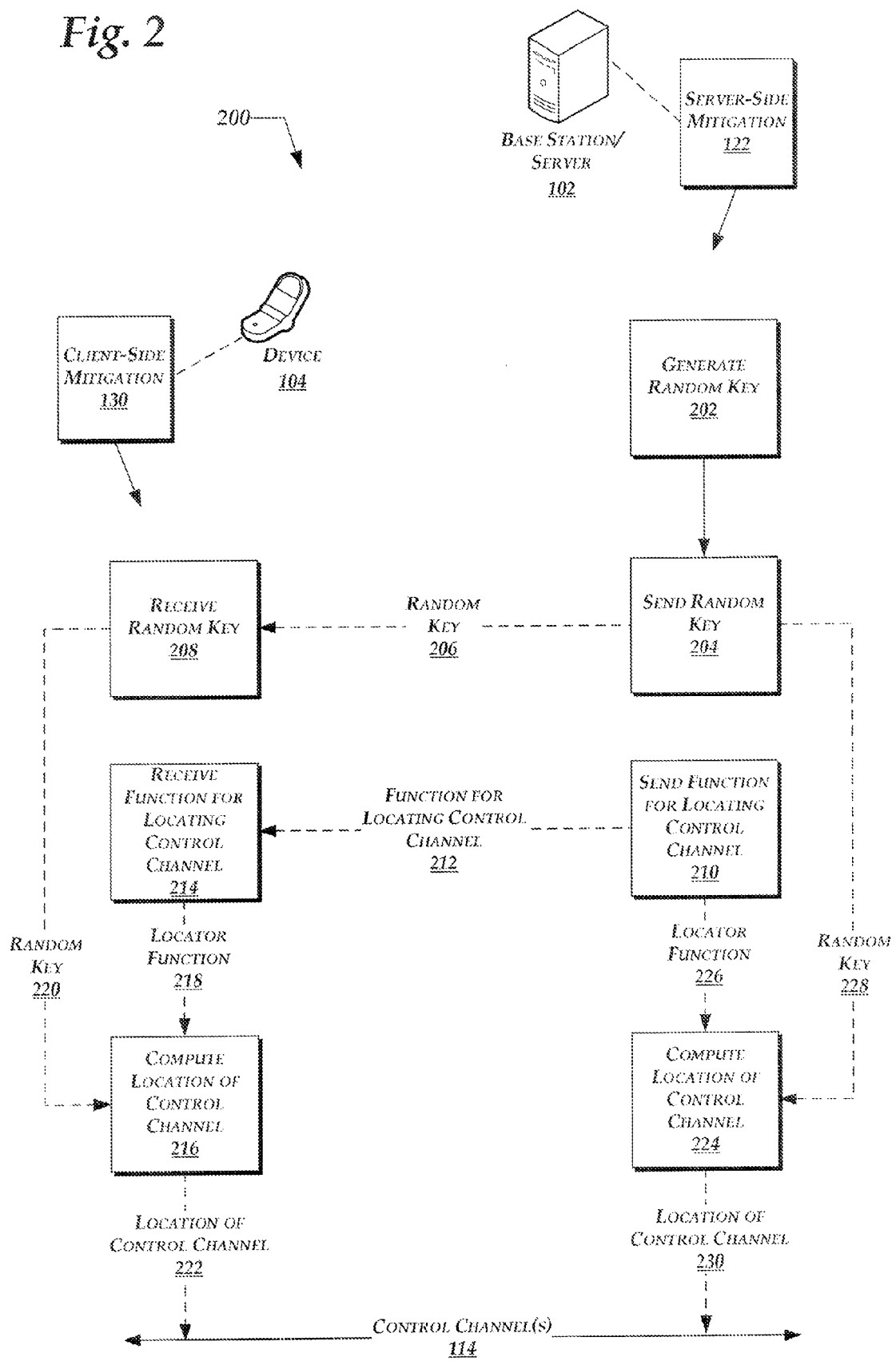
FIG. 2 is a combined block and data flow diagram illustrating exemplary processes and data flows for probabilistic mitigation of control channel jamming via random key distribution.

FIG. 2 illustrates exemplary process and data flows, denoted generally at 200, for probabilistic mitigation of control channel jamming via a random key distribution. To facilitate reference and description, but not to limit possible implementations, FIG. 2 may carry forward some items described previously, as denoted by similar reference numbers. For example, FIG. 2 carries forward an example of a base station/server (e.g., 102), along with related software components (e.g., server-side mitigation components 122). FIG. 2 also carries forward an example of a client device (e.g., 104), along with related software components (e.g., client-side mitigation components 130). For ease of description, but not to limit possible implementations, the process and data flows are arranged in columns as shown in FIG. 2 to illustrate flows between the base station and the client device.

Beginning at the base station, block 202 represents generating and assigning one or more random keys to be associated with client devices. As described in further detail below in FIG. 5, block 202 may include probabilistically generating the random keys to provide the overall system with increased resilience to attacks that attempt to jam control channels.

Block 204 represents sending one or more instances of the random keys to one or more client devices 104. FIG. 2 denotes at 206 the random keys as sent from the server systems to the client devices.

At the client devices, block 208 represents receiving one or more random keys 206 from the servers. Block 208 may include storing the random keys 206 for later reference. For example, block 208 may include storing the random keys into the media elements 128 shown in FIG. 1.

Returning to the server 102, block 210 represents sending a representation of a function for locating control channels to one or more of the client devices 104. FIG. 2 denotes at 212 an example function for locating control channels. As described in further detail below, protocols described herein may assign discrete instances of the control channels (e.g., 114) randomly within timeslots and an available range of frequencies. These protocols may also enable the servers 102 and the client devices to compute the times and frequencies to which the control channels are assigned, using the channel locator functions 212. In turn, the channel locator functions may receive as input the random key 206, which was generated in block 202 and sent to the client devices in block 204.

Turning to the client device, block 214 represents receiving the channel locator function 212. In turn, having received the random key 206 and the channel locator function 212, the client device may now compute locations of control channels. Block 216 generally represents the client computing the location of the control channel, using the locator function 218 and an input random key 220. FIG. 2 denotes at 222 a control channel whose location was computed by block 216.

Returning briefly to the server, block 224 represents computing locations of control channels. On the server side, FIG. 2 denotes the locator function at 226 and the input random key at 228. In turn, block 224 may calculate the location of the control channel on the server side, as indicated at 230.

Figure 3:
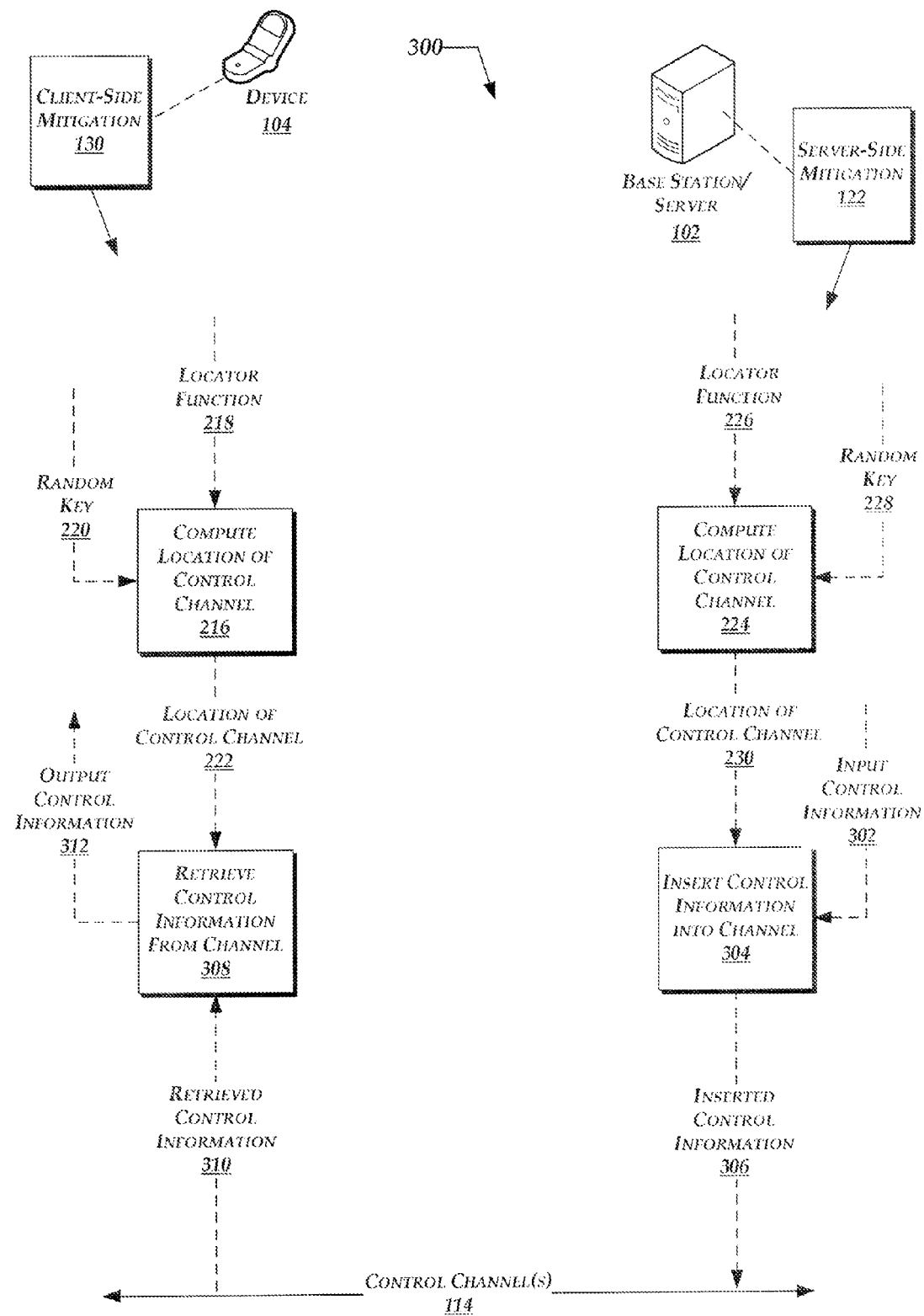
FIG. 3 is a combined block and data flow diagram illustrating exemplary processes and data flows for transmitting control information between servers and client devices.

FIG. 2 carries forward examples of control channels, represented in linear form at 114 to indicate that these control channels may enable the servers 102 to communicate with client devices 104. Having established the above protocols between the servers and the client devices for locating the time and frequency of particular instances of the control channels, these servers and client devices may exchange control information as appropriate. FIG. 3 illustrates an example transmission of control information from a server to a client device, with the understanding that the servers and client devices may transmit any number of instances of control information between themselves.

FIG. 3 illustrates exemplary processes and data flows, denoted generally at 300, for transmitting control information between servers and client devices. To facilitate reference and description, but not to limit possible implementations, FIG. 3 may carry forward some items described previously, as denoted by similar reference numbers. For example, FIG. 3 carries forward the server 102, along with related server-side mitigation components 122. FIG. 3 also carries forward the client device 104, along with client-side mitigation components 130.

In the example shown in FIG. 3, assume that the server 102 wishes to send control information 302 to one or more client devices 104. As described in FIG. 2 above, block 224 on the server may compute locations 230 (located in terms of frequency and time) of control channels over which to send this control information. More specifically, block 224 may use the locator function 226 and the input random key 228. On the device side, block 216 may compute locations 222 of the control channels from which to extract this control information, using the locator function 218 and the input random key 220.

In the example shown, block 304 represents inserting the input control information into the control channel, whose location 230 was calculated in block 224. FIG. 3 denotes at 306 the control information as inserted into the location 230 within the control channels 114.

On the device side, block 216 may calculate the location 222 (located in terms of frequency and time), using the locator function 218 and the random key 220. Block 308 represents retrieving the control information from the calculated location 222 within the control channel 114. More specifically, block 308 may include retrieving or extracting the control information that the server previously inserted into the control channel. FIG. 3 denotes at 310 the control information as retrieved by the device from the control channel 114. In addition, FIG. 3 denotes at 312 the control information as output by block 308, ready for processing elsewhere within the device 104.

For ease of illustration, FIG. 3 illustrates a scenario in which the server transmits control information to one or more devices or servers. However, it is understood that implementations of the process and data flows 300 may support flows of control channel information in any direction between the devices and servers.

Having described the process and data flows in FIGS. 2 and 3, the discussion now proceeds to a more detailed description of how the tools and techniques for probabilistic mitigation of control channel jamming may allocate control channels to particular frequencies and timeslots. This discussion is now presented with FIG. 4.

Figure 4:
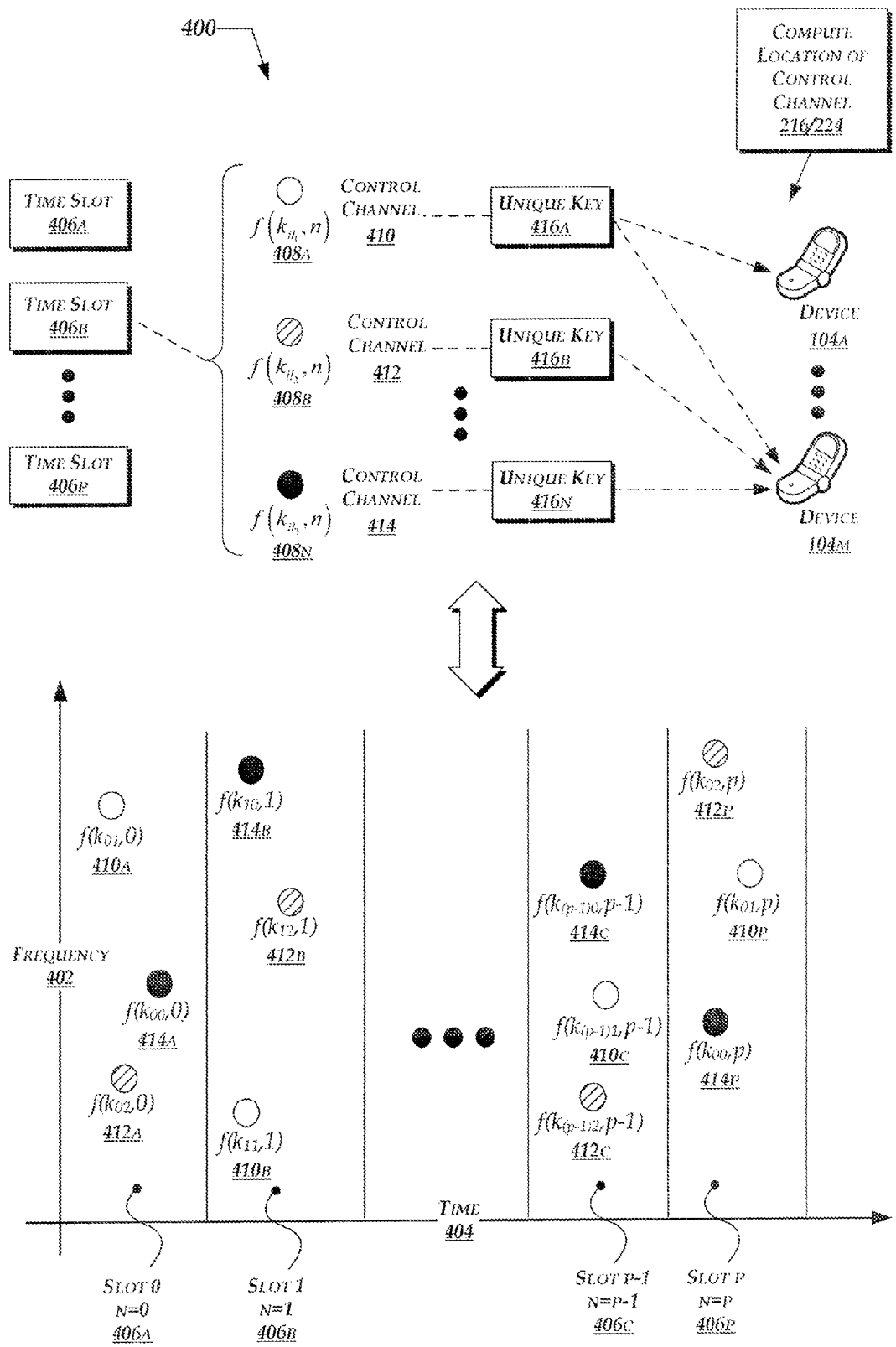
FIG. 4 is a diagram illustrating exemplary scenarios in which control channels associated with several different client devices may be arbitrarily located within different frequencies and timeslots.

FIG. 4 illustrates exemplary scenarios, denoted generally at 400, in which control channels associated with several different client devices may be arbitrarily located within different frequencies and timeslots. To facilitate reference and description, but not to limit possible implementations, FIG. 4 may carry forward some items described previously, as denoted by similar reference numbers. For example, FIG. 4 carries forward examples of the devices, denoted at 104a, 104b, and 104m, along with a representative control channel 114. FIG. 3 also carries forward examples of processing blocks for computing locations of control channels, referenced as 216 on the client side, and as 224 on the server side.

Referring first to the lower portion of FIG. 4, a frequency axis 402 represents an illustrative range of available frequencies for the control channels, and a time axis 404 is subdivided into a plurality of discrete timeslots, denoted generally at 406. More specifically, FIG. 4 illustrates examples of these timeslots at 406a, 406b, 406c, and 406p.

Generally, time is assumed to be slotted into a set of p time slots that are repeated periodically, such that at time n, users may access control channels within $i \equiv n \pmod{p}$. Locations of the control channels may be arbitrarily located in time and frequency. Moreover, the time duration of a particular packet of control information is assumed to be negligible compared to overall duration of a timeslot.

Servers may transmit a common control packet over all control channels in a period of p time slots. To enable control channel hiding, both servers and users may locate control channels within a given time slot by using a control channel locator function (e.g., 218 and 226, as described above). More formally, the locator function may be expressed as $f(k_{il}, n)$, where $k_{il}$ represents a control channel identifier that uniquely identifies the $l^{th}$ control channel in time slot i, and where n represents the current time, such that $i \equiv n \pmod{p}$.

Referring to the upper portion of FIG. 4, this portion of FIG. 4 illustrates a sequence of timeslots 406a, 406b, and 406p. Any number of control channel locations may appear at various times and frequencies. Within these timeslots 406, locations for these control channels may be computed using respective locator functions 408a, 408b, and 408n, with FIG. 4 illustrating instances of different control channel locations at 410, 412, and 414. For ease of reference and tracking, FIG. 4 applies distinctive fill patterns to the different keys used to compute the locations of the three different control channels.

In turn, different instances of these control channels within a given time slot (e.g., 406b) may be associated with different keys that are unique within the given timeslot. FIG. 4 provides examples of unique keys, denoted respectively at 416a, 416b, and 416n (collectively, unique keys 416). More specifically, the locator function 408a (e.g., $f(k_{il_1}, n)$) may compute the locations of the control channel 410 using the key 416a, the locator function 408b (e.g., $f(k_{il_2}, n)$) may compute the locations of the control channel 412 using the key 416b, and the locator function 408n (e.g., $f(k_{il_3}, n)$) may compute the locations of the control channel 414 using the key 416n.

A given wireless communications network may generally include M mobile wireless users or subscribers using respective instances of the client devices 104. FIG. 4 illustrates two representations of such devices, denoted at 104a and 104m. These mobile users may receive control packets from the servers using a set of control channel locations that are distributed over time and frequency. In general, the client devices 104 may be randomly assigned one or more keys 416 for a given timeslot, as generally represented by the dashed arrows connecting the key representations 416 with the device representations 104. In the non-limiting example shown, the device 104a holds the unique key 416a, while the device 104m holds the unique keys 416a, 416b, and 416n.

The lower part of FIG. 4 illustrates an example model for accessing control channels. This model illustrates a sequence of respective timeslots 406, with representations of control channels shown at arbitrary frequencies and times within these different timeslots. For example, referring to the timeslot 406a, respective instances of the control channel locations 410a, 412a, and 414a are allocated to arbitrary frequencies and times within this timeslot. Similarly, within the timeslot 406b, control channel locations 410b, 412b, and 414b are assigned to arbitrary frequencies and times within this timeslot. Likewise, control channel locations 410c, 412c, and 414c may appear at the example frequencies and times shown within the timeslot 406c. Finally, control channel locations 410p, 412p, and 414p may appear at the example frequencies and times shown within the timeslot 406p.

Figure 5:
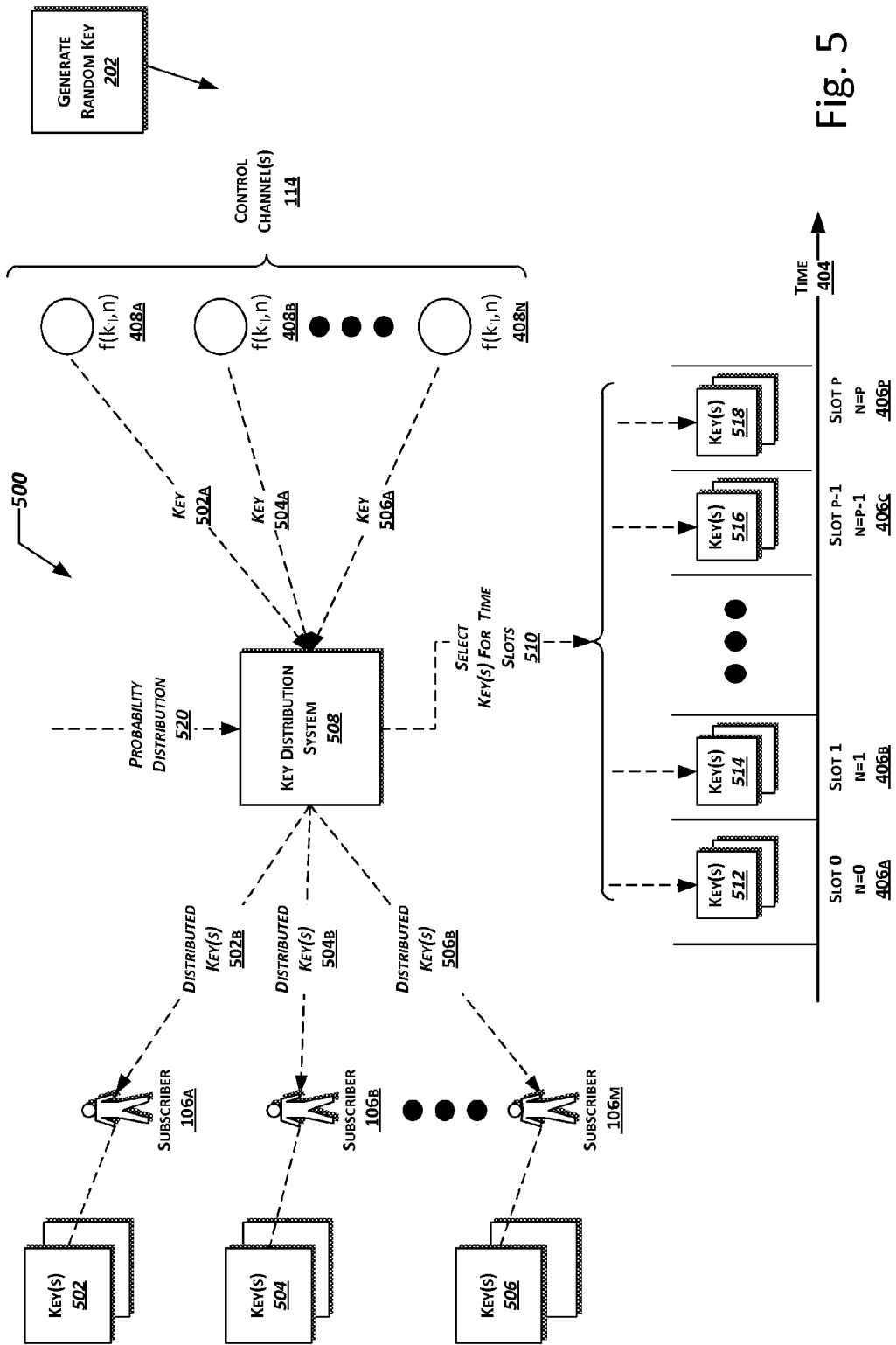
FIG. 5 is a combined block and data flow diagram illustrating exemplary components and data flows relating to random key distribution.

Before turning to a detailed description of random key distribution in FIG. 5, the discussion provides a description of illustrative adversary models, as related to the above model for accessing control channels. Under this model, one or more malicious internal users may locate a significant portion of control channels. These malicious users may then collude to jam the accessible control channels, and deny service to honest users. Alternatively, one or more external adversaries may compromise valid users, and assume their identities in the network. A single adversary may then act as a group of malicious colluders to jam the accessible control channels, similar to the example above.

For purposes of this description, the effect of internal and external adversaries on the scheme for accessing the control channel may be indistinguishable. Accordingly, for ease of discussion, this description combines both internal and external adversaries into a common adversary model. Users who are either malicious insiders or who have been compromised by an external adversary are referred to herein as compromised users. More formally, this description refers to the set of such compromised users as C. This discussion proceeds under the assumption that adversaries will jam every control channel that can be located using the keys held by compromised users. The ability for a set of compromised users to locate and jam a set of control channels depends on the control channel locator function $f$ described above. Beginning with FIG. 5, this description describes how users (or devices associated therewith) may access control channels via the channel locator function $f$, while providing the overall system with a degree of resilience to jamming by compromised users.

FIG. 5 illustrates exemplary components and data flows, denoted generally at 500, relating to random key distribution, using the tools and techniques described herein. To facilitate reference and description, but not to limit possible implementations, FIG. 5 may carry forward some items described previously, as denoted by similar reference numbers. For example, FIG. 5 carries forward an example time axis denoted at 404, which is subdivided arbitrarily into a plurality of p respective timeslots, denoted at 406a-406p. In addition, without limiting possible implementations, FIG. 5 may be understood to elaborate further on the processing block 202 from FIG. 2, which processing block represents generating random keys. As such, the base station or server 102 may perform at least portions of the components and data flows shown in FIG. 5.

For the purposes of this description, the p time slots in each period are assumed to be independent. Thus, this discussion describes representative processing for a single time slot, with the understanding that implementations could similarly process any number of other such independent timeslots.

FIG. 5 illustrates a bipartite graph, with left and right node sets respectively corresponding to a set of users (e.g., subscribers 106a, 106b, and 106m) and a set of control channels (collectively, control channels 114; severally, respective control channel locations 408a, 408b, and 408n). An edge between a left and a right node exists whenever the corresponding user (or a subscriber device associated therewith) has the control channel identifier $k_{il}$ to compute at least one of the control channel locations using the locator function $f(k_{il}, n)$. In this example, as soon as a given adversary compromises a user who possesses the identifier $k_{il}$, that adversary can jam a control channel as calculated using this identifier $k_{il}$.

For the purposes of this description, the right node set in FIG. 5 may thus be isomorphic to the set of control channel identifiers $k_{il}$. FIG. 5 may represent the different control channel identifiers $k_{il}$ with corresponding symmetric cryptographic keys. In these examples, two left nodes joined to a common right node would represent a pair of users that share a symmetric key, thus indicating that the users can establish a secure communication channel with one another. An adversary compromises the security of an established channel as soon as one user with the corresponding key $k_{il}$ is compromised, thus demonstrating a mapping between control channel access and secure communication channel establishment. This mapping may allow previous techniques for key distribution frameworks to provide resilient access to control channels. In particular, the control channel locator function can be implemented using a keyed cryptographic hash function, and a compromised user with a key $k_{il}$ can jam any locatable control channels. The control channel identifiers $k_{il}$ used as input to the channel locator function $f$ are hereafter referred to as control channel keys. FIG. 5 denotes examples of these keys at 502, 504, and 506. For a given timeslot, these keys may be associated respectively with the control channels 408a, 408b, and 408n, as indicated by the arrows at 502a, 504a, and 506a. In turn, a key distribution system 508 may receive these various keys, and allocate them to various subscribers as represented generally at 502b, 504b, and 506b. The description below may thus define metrics of resilience to control channel jamming as a function of the key distribution scheme used by the system 508 to allocate the control channel keys to the users.

To facilitate the description below, Table 1 below provides the following summary of notation:

TABLE 1

| Symbol | Definition |
|---|---|
| N | number of users |
| p | number of time slots |
| $q_i$ | number of control channels in time slot i |
| $K_i$ | set of $q_i$ channel keys for time slot i |
| $k_{il}$ | $l^{th}$ channel key in $K_i$ |
| $m_i$ | number of keys in $K_i$ assigned to each user |
| $S_{ij}$ | set of $m_i$ keys in $K_i$ assigned to user j |
| $S_{ij(m)}$ | $m^{th}$ channel key in $S_{ij}$ |
| $\lambda(k_{il})$ | number of users with $k_{il} \in S_{ij}$ |
| $P_i(\lambda)$ | probability distribution of $\lambda(k_{il})$ |
| $\mu_i$ | average of $P_i(\lambda)$, equal to $\dfrac{Nm_i}{q_i}$ |
| C | set of compromised users |
| $r_j(c)$ | resilience to c compromised users for user j |
| r(c) | average resilience over all users |
| $p_j(c)$ | probability j is falsely accused for c compromised users |
| $\rho(c)$ | average false accusation probability over all users |
| d(c) | delay due to jamming by c compromised users |

Having established the above notational scheme, let $K_i = \{k_{i0}, \ldots, k_{i(qi-1)}\}$ denote the set of $q_i$ control channel keys used to locate the $q_i$ control channels in slot i. The sets $K_i$ are assumed to be pairwise disjoint. The key distribution system

508 may assign users $j \in \{0, \ldots, N-1\}$ a subset $S_{ij} \subset K_i$ of $m_i$ control channel keys for particular slots i denoted $S_{ij} = \{s_{ij}^{(0)}, \ldots, s_{ij}^{(m_i-1)}\}$. It is noted that the key distribution system may assign different numbers of keys to different users.

As denoted at 510, the key distribution system 508 may randomly select the subsets of keys $S_{ij}$ for each slot i from $K_i$, while probabilistically controlling the number $\lambda(k_{il})$ of subsets that contain given particular keys $k_{il}$. FIG. 5 illustrates various keys as associated with particular timeslots, denoted at 512, 514, 516, and 518. The variables $\lambda(k_{il})$ maybe controlled by specifying the probability distribution $P_i(\lambda)$ (denoted at 520) of the variables as a parameter to the key distribution algorithm used by the system 508. Implementations of the distribution $P_i$ may yield an average $\mu_i = Nm_i/q_i$.

The environment shown in FIG. 5 thus provides a framework for random control channel key distribution. The discussion now proceeds to techniques for evaluating probabilistic performance metrics with respect to the given framework. Implementations of this description may then use analytical results of this evaluation to design a key distribution scheme appropriate for a particular application or setting.

Performance Analysis

The performance of random control channel key distribution schemes in the framework of FIG. 5 is evaluated with respect to the set of compromised users C. This description focuses on the average performance of the system, as a function of the number of compromised users $c = |C|$.

A. Resilience To Compromised Users

The performance of a distribution schemes for random control channel keys can be evaluated in terms of the ability for a given user to access a control channel that is not jammed by compromised users. The probabilistic metric of resilience to compromised users is thus defined as follows. Define $r_j^i(c)$ as the probability that a given user j may access, in a time slot i, a control channel that is not jammed by any of the c compromised users. This is equivalent to the probability that user j has a control channel key in $K_i$ that is not held by any of the c compromised users, given by:

$$r_j^i(c) = Pr\left[S_{ij} \not\subseteq \bigcup_{t \in C} S_{it}\right] = 1 - Pr\left[S_{ij} \subseteq \bigcup_{t \in C} S_{it}\right] \quad (1)$$

The resilience for user j is then defined as the probability $r_j^i(c)$ that user j can access a least one control channel in p slots that are not jammed by the c compromised users, given by:

$$r_j(c) = 1 - \prod_{i=0}^{p-1} (1 - r_j^i(c)). \quad (2)$$

The resilience can be averaged over all users $j \in \{0, \ldots, N-1\}$ and expressed as $r(c)$. The intermediate step of computing $r_j^i(c)$ is provided by Lemma 1.

Lemma 1: The probability $r_j^i(c)$ can be approximated as $$r_j^i(c) \approx 1 - \prod_{m=0}^{m_i-1}\left(1 - \left(\frac{N - \lambda(s_{ij}^{(m)})}{N-1}\right)^c\right).$$

Proof: The probability $r_j^i(c)$ given in (1) can be written as:

$$r_j^i(c) = 1 - \prod_{m=0}^{m_i-1} (1 - Pr[s_{ij}^{(m)} \notin S_{it}, t \in C]) \quad (3)$$

$$\approx 1 - \prod_{m=0}^{m_i-1}\left(1 - \prod_{t \in C} Pr[s_{ij}^{(m)} \notin S_{it}]\right). \quad (4)$$

Since $\lambda(s_{ij}^{(m)})$ users hold the key $s_{ij}^{(m)}$, the probability that a compromised user does not hold $s_{ij}^{(m)}$ is:

$$Pr[s_{ij}^{(m)} \notin S_{it}] = \frac{N - \lambda(s_{ij}^{(m)})}{N - 1}, \quad (5)$$

and substitution of (5) into (4) completes the proof.

The resilience $r_j(c)$ for user j can be computed using (2) and the result of Lemma 1. The average resilience for any user in the system can then be computed using Theorem 2 as follows:

Theorem 2: The average resilience $r(c)$ for $c = |C|$ compromised users can be approximated as:

$$r(c) \approx 1 - \prod_{i=0}^{p-1}\left(1 - \left(\frac{N - \mu_i}{N-1}\right)^c\right)^{m_i},$$

Where $\mu_i$ is the expected value of $\lambda(s_{ij}^{(m)})$ according to a probability distribution $P_i(\lambda)$.

Proof: The result is obtained from (2) and Lemma 1 by replacing each $\lambda(s_{ij}^{(m)})$ with its expected value $\mu_i$.

When $q_i = q$ and $m_i = m$ for all i, the resilience $r(c)$ in Theorem 2 takes the form $$r(c) \approx 1 - \left(1 - \left(\frac{N-\mu}{N-1}\right)^c\right)^{mp}. \quad (6)$$

The above analysis yields the average resilience probability taken over all sets of compromised users C such that $|C| = c$ and does not assume that the adversary has any knowledge about the keys assigned to particular users.

B. Identification of Compromised Users

Implementations of the tools and techniques for resilient control channel access may provide the ability for servers to identify the set of compromised users in a centralized manner. Assuming that the server maintains a record of the sets $S_{ij}$ and can detect jamming, it may be possible to identify the set of compromised users, revoke them from the system, and update the remaining users with fresh keys. However, if all the keys held by a valid user are held by compromised users, the valid user may be falsely accused and revoked from the system, characterized probabilistically as follows.

Let $\rho_j(c)$ represent the probability that user j is falsely accused by the centralized server, when there are c compromised users. Assuming that one or more adversaries jam all accessible channels, the probability of false accusation is the complement of the resilience probability $r_j(c)$ for user j. Hence, the probability $\rho_j(c)$ can be approximated using the results of Lemma 1 and Theorem 2.

When $q_i=q$ and $m_i=m$ for all i, the false accusation probability $\rho(c)$ can be approximated using Theorem 2 as:

$$\rho(c) \approx 1 - \left(1 - \left(\frac{N-\mu}{N-1}\right)^c\right)^{mp}$$

Given the probabilities r(c) and $\rho(c)=1-r(c)$, the probability distribution of the number M(c) a falsely accused users can be computed as a function of the number of compromised users c as follows.

Theorem 3: The probability that $M(c)=\eta$ of the (N−c) valid users are falsely accused when there are c compromised users is approximated as:

$$Pr[M(c) = \eta] \approx \binom{N-c}{\eta} \rho(c)^\eta r(c)^{N-c-\eta}.$$

Proof This result follows by treating each false accusation as a Bernoulli random variable with probability $\rho(c)=1-r(c)$, yielding the desired binomial representation.

The result of theorem three can be used to evaluate further metrics of false accusation, such as the expected number of falsely accused users (given by the mean of the distribution), or the probability that the c compromised users are uniquely identified (given by Pr[M(c)=0]).

C. Delay

When there are compromised users in the system and a fraction of the available control channels have been jammed, a user may wait for multiple timeslots before an accessible channel is available. In light of such possible circumstances, this discussion proceeds with a description of distribution user delay as a function of the number of compromised users c.

With probability $1-r_j(c)$, every control channel that a user j can locate would be jammed, and the user j would be unable to access a control channel, corresponding to an infinite delay. However, with probability $r_j(c)$, the user j would have a finite delay of 0 to (p−1) timeslots. Thus, the discussion proceeds to compute the conditional delay of user j given that the delay is finite.

Suppose that a user $j \notin C$ attempts to access a control channel at time n, but that the next accessible control channel is not available to the user j until time n', $n \leq n' \leq n+p-1$. The delay for user j at time n is thus defined as $d_j(c,n)=n'-n$. Note that n and n' may exist in adjacent periods of the control channel access scheme, corresponding to reception of distinct control packets. The distribution of this user delay may be characterized as follows.

Lemma 4: The probability distribution $Pr[d_j(c,n)=\delta]$ of delay for user j is given by:

$$Pr[d_j(c, n) = \delta] = \gamma r_j^{n+\delta \bmod p}(c) \prod_{d=0}^{\delta-1} \left(1 - r_j^{n+d \bmod p}(c)\right)$$

where $\gamma$ is a normalization constant that may cause the probability to sum to 1 over all $\delta \in \{0, \ldots, p-1\}$.

Proof: The probability that user j would wait $\delta$ time steps before a channel is available is the probability that there is no channel available at times n, ..., n+$\delta$−1 and that there is a channel available at time n+$\delta$. For each n', the probability that there is not a channel available is $(1-r_j^{n' \bmod p}(c))$, and the probability that there is a channel available is $r_j^{n' \bmod p}(c)$.

When $q_i=q$ and $m_i=m$ for all i, the slot-specific resilience probabilities $r_j^i(c)$ for all i will be equal, and the delay distribution will not depend on n on average. The delay can further be averaged over all users $j \notin C$ as d(c) as follows:

Theorem 5: The average delay d(c) when $q_i=q$ and $m_i=m$ satisfies the probability distribution $$Pr[d(c) = \delta] = \frac{r^0(c)}{r(c)}(1 - r^0(c))^\delta$$

Where $r^0(c)$ is the slot-specific resilience for each of the p timeslots obtained by averaging $r_j^0(c)$ over all users j.

Proof: Since $q_i=q$ and $m_i=m$, these slot-specific resilience $r_j^i(c)$ is equal for all i, and can be replaced in the result of Lemma 4 by $r_j^0(c)$. Averaging over all users $j \notin C$ effectively replaces each $r_j^0(c)$ with $r^0(c)$. The normalization constant $\gamma=1/r(c)$ is computed algebraically using the fact that the summation of $Pr[d(c)=\delta]$ is a finite geometric sum.

Figure 6:
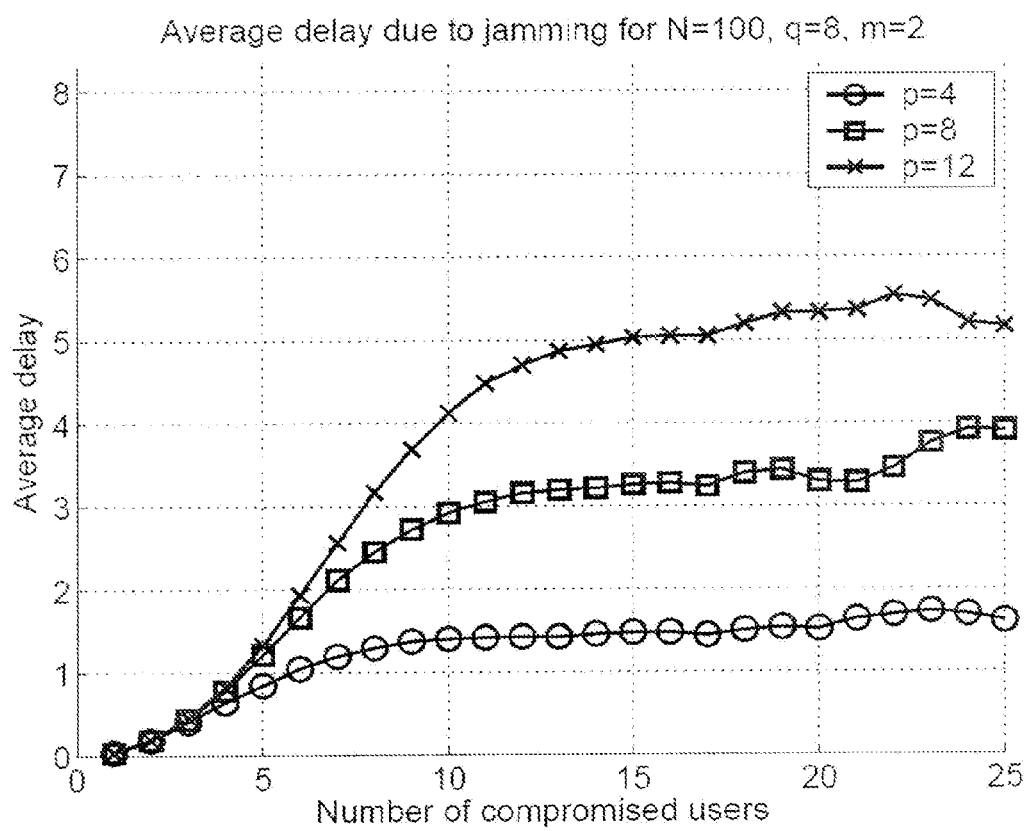
FIG. 6 is a graph illustrating different exemplary scenarios in which a number of timeslots p may assume different values.

The results of Lemma 4 and Theorem 5 characterizing user delay can then be used to study delay characteristics. For example, the expected value of the delay distribution may yield the expected average delay D(c) experienced by users in the system, as a function of the number of compromised users c. In a more specific example, the graph below illustrates relationships between the numbers of compromised users and resulting average delay, with the parameters N=100, q=8, and m=2, with N representing the number of users, q representing the total number of keys allocated per slot, and m representing the number of keys allocated to each user. Graph 1, shown at 600 in FIG. 6, illustrates different exemplary scenarios in which the number of slots p assumes three different values (4, 8, and 12).

Discussion and Observations

The framework for random control channel key distribution as described above, and the related performance analysis, can be used to design control channel key distribution schemes with a variety of application- and platform-specific details. As compared to previous approaches that feature deterministic schemes, the frameworks described herein exhibit less dependence between the parameters p, $q_i$, and $m_i \leq q_i$ in a random control channel key distribution scheme. In implementations of the framework described herein, various trade-offs can be identified relating the efficiency or overhead of the control channel access protocol any resilience to compromised users. In the interest of conciseness, this description identifies these trade-offs as follows:

Variations on Number of Slots: As seen in Lemma 1 and Theorem 2, an increase in the number of slots p may lead to an exponential improvement in the resilience to attack. However, this increase may also lead to a linear increase in key storage for the user devices and for the system servers. In addition, if there are a large number of compromised users, the average delay between receiving successive control packets may increase linearly with p, as seen in Graph 1 above.

Variations on the Number of Keys: The resilience probability given in Theorem 2 and the definition $\mu_i=Nm_i/q_i$ suggests that increasing both $m_i$ and $q_i$ by a constant multiple a does not change $\mu_i$, yielding an exponential improvement in resilience to compromised users. Hence, a linear increase in both user and server storage may lead to an exponential improvement in resilience. This may also increase the total number of control channels and, thus, may increase system overhead.

Figure 7:
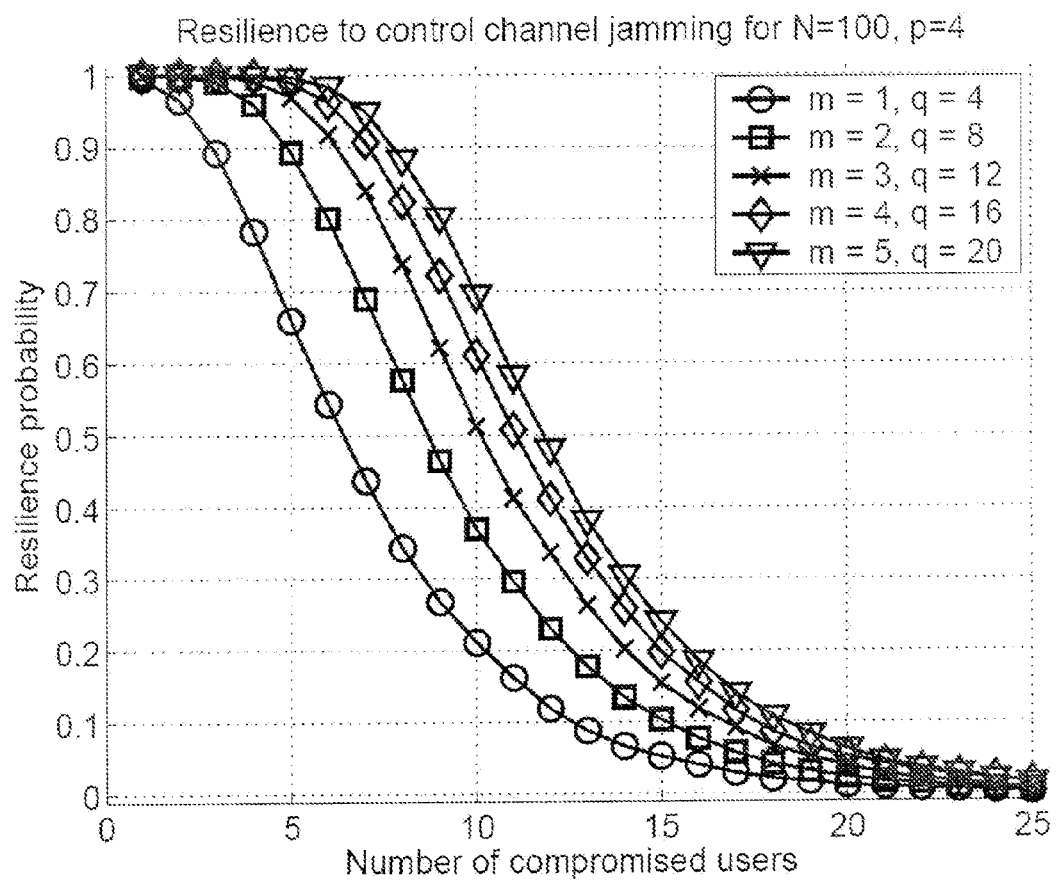
FIG. 7 is a graph illustrating exemplary trade-offs between storage and resilience in implementations of this description.

Graph 2, shown at 700 in FIG. 7, illustrates exemplary trade-offs between storage and resilience. Graph 2 illustrates how the resilience probability r(c) may relate to the number of compromised users in a simulation for N=100 users in a system with p=4 timeslots. The values $m_i$=m and $q_i$=q are scaled such that m/q is constant, illustrating improvement in resilience r(c) as key storage increases.

The subject matter described above is provided by way of illustration only and does not limit possible implementations. Various modifications and changes may be made to the subject matter described herein without following the example embodiments and applications illustrated and described, and without departing from the true spirit and scope of the present description, which is set forth in the following claims.

We claim:

1. A computer-based method comprising at least:
   generating a plurality of random cryptographic keys to be associated with a plurality of client devices;
   for a time slot of a plurality of time slots, at least one of (i) randomly selecting a subset of random cryptographic keys wherein the random cryptographic keys are probabilistically generated, or (ii) randomly selecting a subset of a number of subsets of random cryptograph key wherein the number of subsets that contain particular random cryptographic keys is probabilistically controlled;
   assigning the selected subset of random cryptographic keys for said time slot to at least one said client device, said time slot at least partially identifying a control channel;
   sending the random cryptographic keys in the selected subset to the at least one client device;
   sending at least one function to the at least one client device, wherein the function is for locating at least one control channel within a wireless communications network; and
   computing at least one location of at least one control channel using the at least one function and using at least one of the random cryptographic keys in the selected subset as the input to the at least one function.

2. The method of claim 1, further comprising inserting at least one instance of control information into the computed location of the control channel, wherein the control information is related to the wireless communications network.

3. The method of claim 2, further comprising transmitting the control information to the client device via the control channel.

4. The method of claim 1, further comprising generating at least a further random cryptographic key that is different from the random cryptographic key, and further comprising sending at least the further random cryptographic key to the at least one client device.

5. The method of claim 4, further comprising associating the random key with a time slot, and wherein computing at least one location includes computing a frequency location for the control channel within the time slot and includes computing a time location for the control channel within the time slot.

6. The method of claim 5, further comprising associating the further random cryptographic key with a further time slot, and further comprising computing at least a further location of at least a further control channel within at least a further time slot using the further cryptographic random key.

7. A non-transitory computer readable storage medium containing instructions that, when loaded into a processor and executed, cause the processor to perform a computer-based method comprising:
   receiving at least one random cryptographic key of a subset of a number of subsets of random cryptographic keys from at least one base station within a wireless communications network, wherein either the random cryptographic keys are probabilistically generated or the number of subsets that contain particular random cryptographic keys is probabilistically controlled, the random cryptographic keys corresponding either to at least one time slot of a plurality of time slots or to a client device, said time slot at least partially identifying a control channel;
   receiving at least one function from at least one base station within the wireless communications network, wherein the at least one function is for locating at least one said control channel within the wireless communications network;
   computing a location of a least one said control channel using the function and the random cryptographic key; and
   at least one of transmitting or receiving on the at least one control channel.

8. The computer readable storage medium of claim 7, further comprising instructions for retrieving at least one instance of control information from the computed location of the control channel, wherein the control information is related to the wireless communications network.

9. The computer readable storage medium of claim 7, wherein the instructions for computing a location of the control channel include instructions for computing at least a frequency at which the control channel is located within a time slot, and includes computing a time location or the control channel within the time slot.

10. The computer readable storage medium of claim 7, further comprising instructions for receiving at least a further random cryptographic key that is different from the random cryptographic key.

11. The computer readable storage medium of claim 10, wherein the instructions for computing a location include instructions for computing the location of the control channel within a time slot using the random cryptographic key, and further comprising instructions for computing at least a further location of at least a further control channel within at least a further time slot using the further random cryptographic key.

12. The computer readable storage medium of claim 11, further comprising instructions for retrieving a least a further instance of control information from at least the further location.

13. A key distribution system for operation within a wireless communications network, the system comprising a non-transitory computer readable storage medium containing instructions that, when loaded into a processor and executed, cause the processor to perform a computer-based method comprising:
   generating representations of a plurality of random cryptographic keys, wherein the keys are associated respectively with a plurality of locations of control channels within the wireless communications network;
   at least one of (i) randomly allocating subsets of the keys to a plurality of subscriber devices within the wireless communications network wherein the random cryptographic keys are probabilistically generated or (ii) randomly allocating subsets of a number of subsets of the keys to a plurality of subscriber devices within the wireless communications network wherein the number of subsets that contain particular random cryptographic keys is probabilistically controlled;

defining a plurality off timeslots, at least one time slot of the plurality of time slots at least partially identifying a control channel;

allocating at least one of the keys to respective ones of the timeslots;

sending the keys to the subscriber devices to which the keys are allocated; and sending at least one function to at least one client device, wherein the at least one function is for locating at least one control channel within the wireless communications network by using the at least one allocated key.

14. The key distribution system of claim 13, wherein the computer readable storage medium further comprises instructions for defining a probability distribution function operative to allocate first subsets of the keys respectively to the subscriber devices, and operative to allocate further subsets of the keys respectively to the timeslots.

15. The key distribution system of claim 14, wherein the probability distribution function probabilistically controls which keys are allocated to the subscriber devices, and probabilistically controls which keys are allocated to the timeslots.

16. The key distribution system of claim 13, wherein the computer readable storage medium further comprises instructions for identifying at least one subscriber device that has been compromised.

17. The key distribution system of claim 16, wherein the computer readable storage medium further comprises instructions for revoking the compromised subscriber devices from the wireless communications system.

18. The key distribution system of claim 16, wherein the computer readable storage medium further comprises instructions for identifying subscriber devices that are not compromised, and further comprising instructions for updating the identified subscriber devices with fresh random cryptographic keys.

* * * * *